US006920206B2

United States Patent
Basore et al.

(10) Patent No.: US 6,920,206 B2
(45) Date of Patent: Jul. 19, 2005

(54) CALL PROGRESS INFORMATION IN CABLE TELEPHONY

(75) Inventors: David L. Basore, Little Silver, NJ (US); Barry S. Bosik, Marlboro, NJ (US); Moshiur Rahman, Freehold, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 10/732,001

(22) Filed: Dec. 10, 2003

(65) Prior Publication Data

US 2004/0120485 A1 Jun. 24, 2004

Related U.S. Application Data

(63) Continuation of application No. 10/193,455, filed on Jul. 10, 2002, now Pat. No. 6,707,893.

(51) Int. Cl.[7] .............................................. H04M 11/00
(52) U.S. Cl. ................................ 379/93.23; 379/90.01; 379/142.16
(58) Field of Search ........................... 379/93.23, 90.01, 379/93.17, 93.25, 102.03, 142.06, 142.16, 142.01; 725/106, 109, 111

(56) References Cited

U.S. PATENT DOCUMENTS

| | | | |
|---|---|---|---|
| 5,566,231 A | 10/1996 | Sizer | |
| 5,790,173 A | 8/1998 | Strauss et al. | |
| 5,805,682 A | 9/1998 | Voit et al. | |
| 5,825,862 A | 10/1998 | Voit et al. | |
| 5,940,484 A * | 8/1999 | DeFazio et al. | 379/93.23 |
| 6,061,434 A | 5/2000 | Corbett | |
| 6,209,025 B1 | 3/2001 | Bellamy | |
| 6,236,653 B1 | 5/2001 | Dalton et al. | |
| 6,243,448 B1 | 6/2001 | Corbett et al. | |
| 6,373,817 B1 | 4/2002 | Kung et al. | |
| 6,377,664 B2 | 4/2002 | Gerszberg et al. | |
| 6,707,893 B1 * | 3/2004 | Basore et al. | 379/93.23 |
| 6,721,406 B1 * | 4/2004 | Contractor | 379/142.06 |
| 2003/0142802 A1 * | 7/2003 | Hong et al. | 379/93.23 |
| 2003/0190024 A1 * | 10/2003 | Ju | 379/142.16 |

* cited by examiner

Primary Examiner—Stella Woo
(74) Attorney, Agent, or Firm—Henry T. Brendzel

(57) ABSTRACT

A method, carried out in an arrangement having a cable that provides programming information to a video monitor as well as telephony service, where call progress information of a telephone call is displayed on the monitor, and the method sends control information upstream, over the cable, in connection with desired information relative to the call progress.

9 Claims, 7 Drawing Sheets

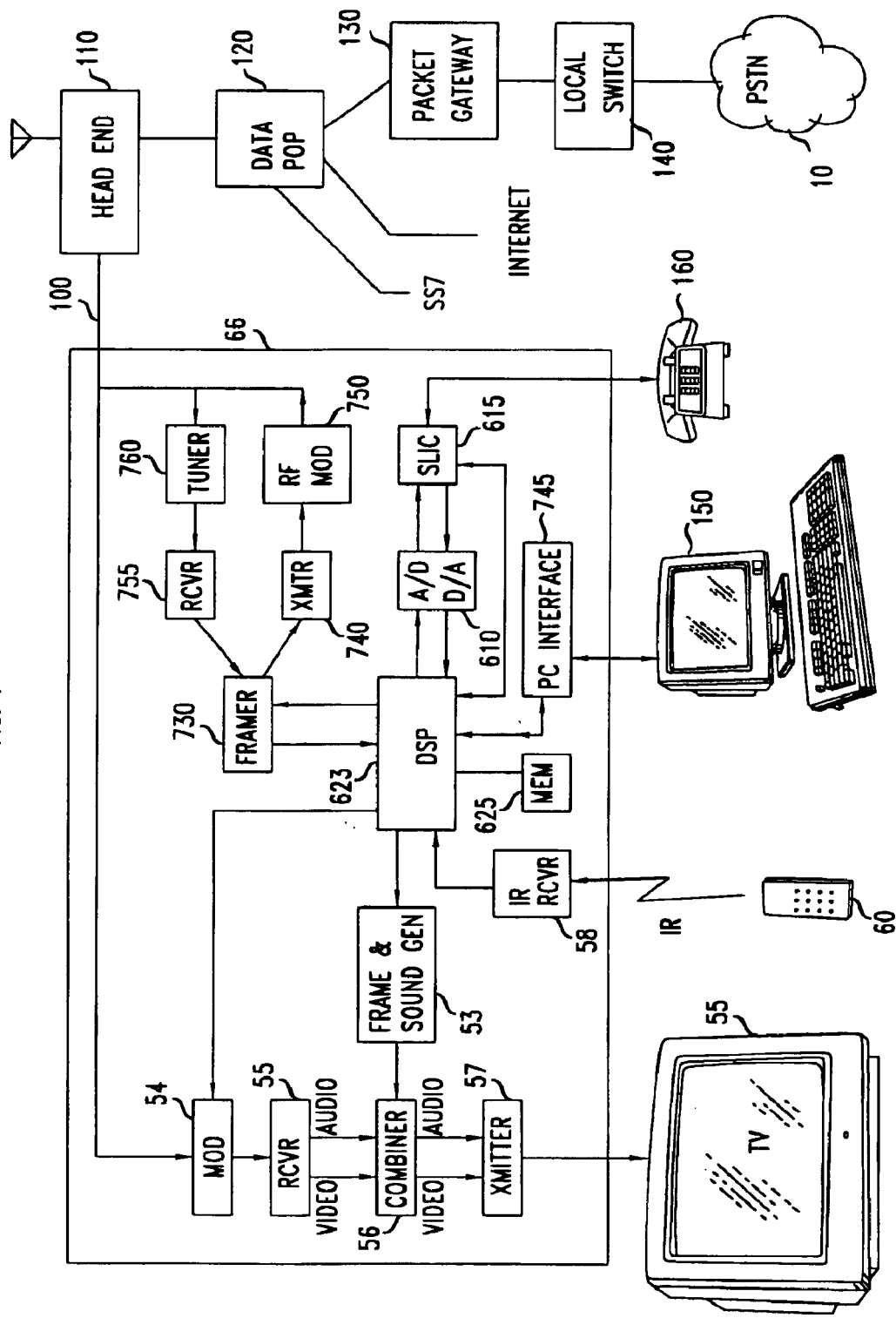

CALL PROGRESS INFORMATION IN CABLE TELEPHONY

RELATED APPLICATION

This is a continuation of U.S. patent application bearing the Ser. No. 10/193,455, filed Jul. 10, 2002. Now U.S. Pat. No. 6,707,893.

BACKGROUND OF THE INVENTION

This invention relates to telephone service over a cable network.

For many years, telecommunication service in the United States has been offered primarily through a network having wire pairs extending to customer homes. More recently, cellular telephony has taken off, and efforts are being made to similarly expand the telecommunication offerings through hybrid fiber-coax cable (HFC).

U.S. Pat. No. 6,236,653 describes an illustrative system, not unlike the one depicted in FIGS. 1 and 2, that provides telephone service through a cable network, as well as Internet service through the cable network. In FIG. 1, a fiber-coax cable 100 extends from head-end station 110 to a plurality of customers, such as customers 200 and 300, which tap into the cable. Cable 100 is representative of an entire network of cables that extend from head-end station 110. Station 110 obtains television signals from some source (for example, the antenna depicted with station 110), modulates those signals into preselected frequency bands, and forwards the signals downstream by means of HFC cable 100. Within a customer's premises, cable 100 signal is received in a set-top box, such as box 210, the set-top box demodulates the received signal in accordance with instructions provided to box 210 by a user, resulting in a specific channel (frequency band) being applied to television monitor 170 at the frequency band to which the tuner within television 170 is set. Thus the user receives a television signal from the specific channel. This is, basically, a one-way broadcast communication arrangement, from head-end 110 to all of the customers on cable 100.

Internet service is provided to PC 150 of customer 200 by interposing cable modem 220 between cable 100 and PC 150. To accommodate such a service, cable 100 and head-end 110 must be adapted to allow two-way communication between the PCs of the various customers that are connected to cable 100 and possess a cable modem, and head end 110 or, more specifically, a data point-of-presence (POP) 120 that is connected to head-end station 110. Relative to Internet service, POP 120 may be an Internet Service Provider (ISP) that is connected to the Internet. Information flows between POP 120 and cable modem 220 in IP packets that, while flowing through cable 100, are modulated onto a carrier.

Telephony service is provided also through cable modem 220, head-end station 110, and POP 120, by carrying the service also through IP packets that flow through cable 110. Thus, modem 220 is more than just a cable modem because it is adapted to handle telephone signals, and POP 120 is more than just an ISP because it is adapted to be connected to local switch 140 of the PSTN, through packet gateway 130, which converts between the analog signals of switch 140 and the IP packets signals of POP 120.

FIG. 2 depicts the structure of cable modem 220, essentially as illustrated in the aforementioned U.S. Pat. No. 6,236,653 patent. Viewed macroscopically, it includes Internet module 700 and a telephony module 600. In module 700, tuner 760 receives signals in the frequency band devoted to IP packet communication and applies its received signal to demodulator 735, which demodulates the received signal to recover a sequence of received TCP/IP or UDP/IP frames and applies them to framer 730. The latter provides a stream of packets to CPU 725, which is a stored-program controller with associated memory 705. CPU 725 provides timing, synchronization and error handling controls to framer 730. CPU 725 also provides IP packets to PC 150 via interface 745. In the upstream direction, packets from PC 150 are applied to framer 730 via interface 745 and CPU 725, and thence to transmitter 740, which provides error correction/detection coding such as Reed-Solomon coding and forms a modulated intermediate frequency (IF) carrier signal. The IF signal is applied to radio frequency (RF) modulator 750, which up-modulates its input signal to the proper frequency bands and forwards the modulated signal to cable 100. Thus, a path is provided for IP packets to flow back and forth between PC 150 and POP 120.

Telephony module 600 comprises a controller that is composed of digital signal processor (DSP) 620 and associated memory 625. The module further comprises analog-digital converter 610, and subscriber-line-interface-circuit (SLIC) 605. The controller performs all of the necessary control telephony functions, converter 610 provides the interface between the digital signals of DSP 620 and the analog signals of SLIC 605 and telephone 160, and SLIC 605 provides the tip/ring interface to telephone 160, such as the ability to sense off-hook, provide loop current, provide dial tone, detect dialing (pulse or DTMF), provide a ringing signal, etc. DSP 620 is coupled to CPU 725 to provide a two-way communication path of digitized telephony signals (IP packets) between telephone 160 and cable 100.

Perusing U.S. Pat. No. 6,236,653 may provide additional insights.

The above described arrangement provides telephony service for telephone 160, digital communication (Internet) service for PC 150 (which has computing capability as well as audio and video capability), and entertainment programming service for TV 170 (which also has audio and video capability)—but all of these services are independent, and do not commingle. We realized that an advance in the art can be attained by allowing these to commingle.

In a related art, U.S. Pat. No. 5,566,231 describes an arrangement for enhancing a customer premises message-recoding device. The enhanced recording device has the ability to store caller ID information arriving from the telephone network in association with the incoming call that is recorded, as well the ability to ascertain the call duration and other information. This information is stored in association with the stored message. Through a remote controller that connects to the enhanced recording device through an IR link, a user can retrieve the stored messages and the stored associated information. To display the retrieved information, the conventional cable-TV connection between the set-top box and the TV monitor is looped through the enhanced recorder, and the retrieved information is displayed on the TV monitor though a video interface connector that is connected to the TV monitor.

What the U.S. Pat. No. 5,566,231 patent suggests is the notion of storing caller ID and other data that is provided by the telecommunication network in association with an incoming call that is recorded, so that thereafter, the information is retrieved by a user and displayed by the user on a TV monitor. However, the patent does not teach how the incoming information is modified to a format suitable for a television monitor, or how the video interface connector interacts with the cable from the set-top box to inject its signal so that it may be displayed on the TV monitor. Moreover, the arrangement is not interactive, in the sense that the enhanced recording device stores information, but the user can only retrieve it. The user cannot control the call progress, or any other interaction with the telecommunication network, based on real time information obtained from the TV monitor.

SUMMARY OF THE INVENTION

An advance in the art is realized in an environment where a cable provides programming information to a television monitor as well as telephony service. In the disclosed method, call progress information of a telephone call is displayed on the television monitor, and means are included in the arrangement for sending control information upstream over the cable in connection with the call progress, for example to obtain additional information. Thus, when call progress information comes from a the cable's head end, a determination is made as to whether it is sufficient, and if not, a query is forwarded upstream to the head end. The head end obtains information that is responsive to the query and sends it downstream, where received additional information is combined with the previously received information and a display on the television monitor is created of the combined information.

DESCRIPTION OF THE DRAWINGS

FIG. 7 presents yet another embodiment in accord with the principles disclosed herein.

DETAILED DESCRIPTION

Figure 1:
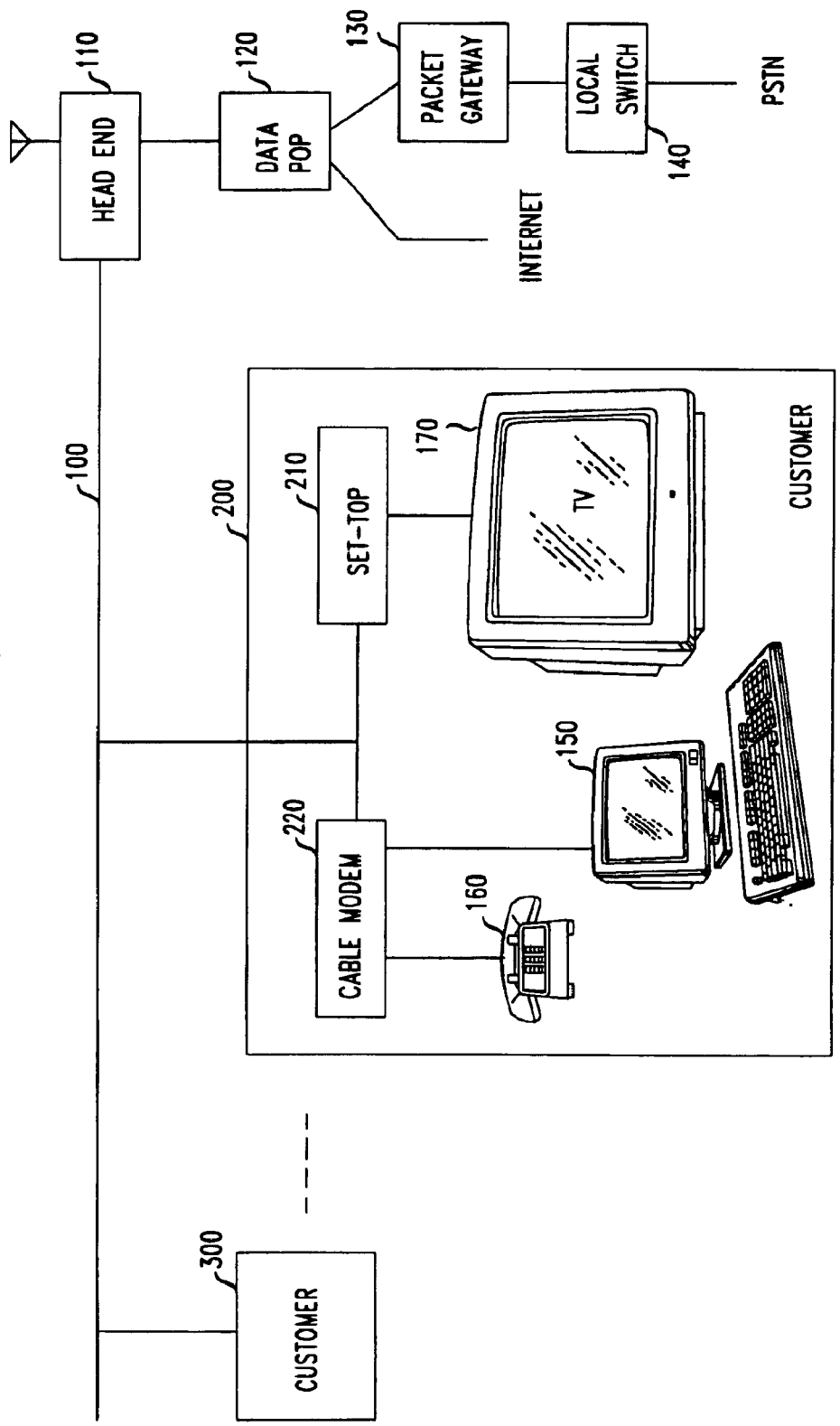
FIG. 1 presents a block diagram of a prior art cable telephony arrangement.
Figure 2:
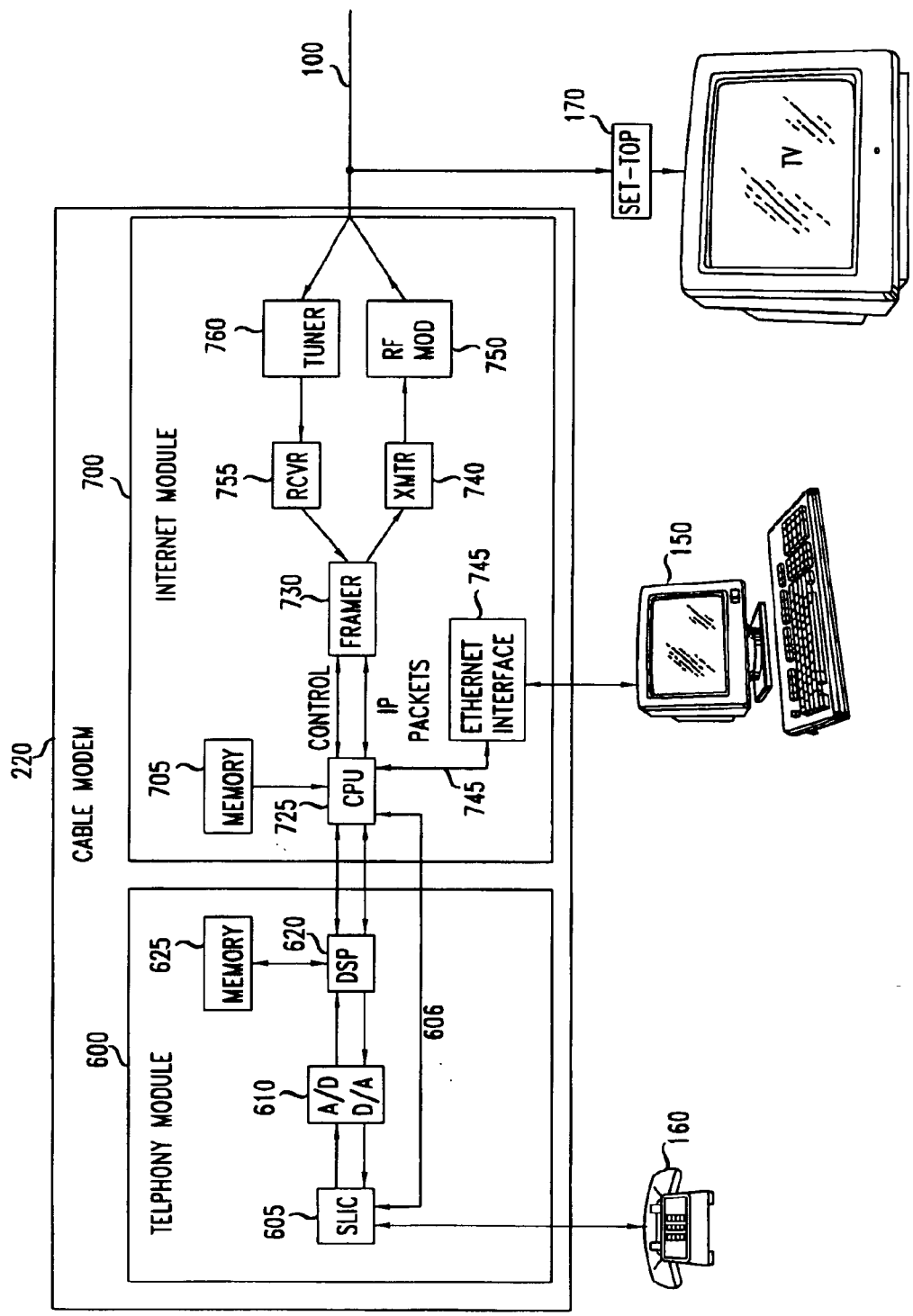
FIG. 2 presents details of the cable modem in the FIG. 1 arrangement that is adapted for telephony service.
Figure 3:
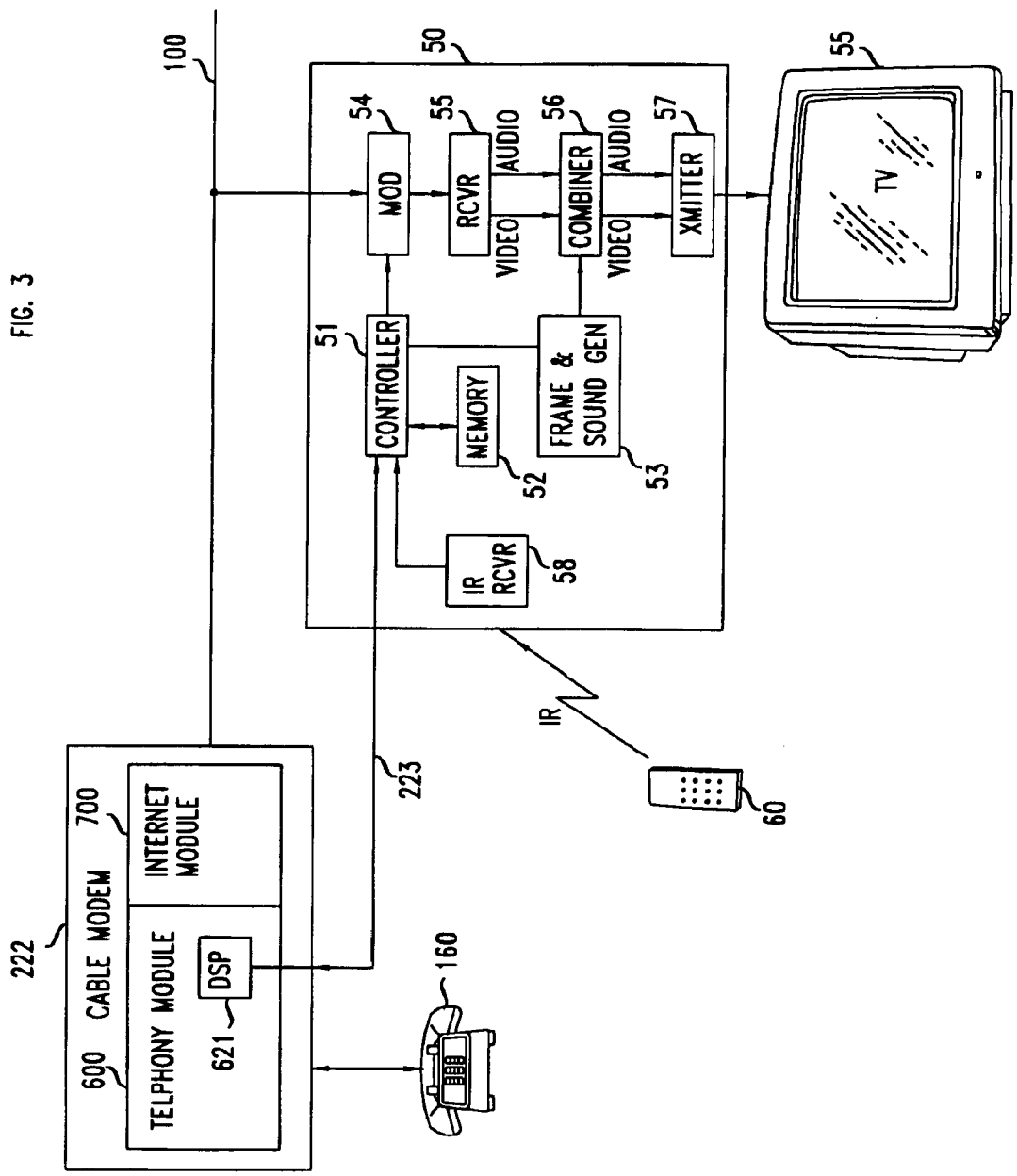
FIG. 3 presents the block diagram of one illustrative embodiment in accord with the principles disclosed herein.

FIG. 3 presents a block diagram of one illustrative embodiment in accord with the principles disclosed herein, where elements with labels that are the same as elements in FIG. 2 perform the same respective functions. FIG. 3 comprises HFC cable 100 that is connected to set-top box 50 and to cable modem 222. Cable modem 222 may be identical to cable modem 220, except for lead 223 that interconnects DSP 621 of modem 222 with set-top box 50. The signal flowing from DSP 620 provides information regarding that which set-top box 50 is to display on TV 55. The signal flowing from set-top box 50 provides telephony control information. DSP 612 is identical to DSP 620 of FIG. 2, except that the set of programs that are resident in memory 625 that is associated with DSP 621 (shown in FIG. 1) includes modules to accommodate the functionalities for which lead 223 is included.

Set-top box 50 comprises numerous elements that, individually, are well known in the art. A signal from cable 100 is received in modulator 54 where, under direction of controller 51, element 54 modulates the incoming signal to shift a particular television broadcast channel in the input signal (specified by a user) to a specific frequency band; for example, the frequency band corresponding to channel 3 in the monitor's internal tuner. The particular desired broadcast channel that is shifted into the specific frequency band is applied to receiver element 55, where it is decomposed to form a baseband video signal and a corresponding audio signal. These two signals are applied to combiner element 56, which, in the absence of any signals from frame & sound generation element 53, transfers its video and audio input signals to its outputs, unchanged. Transmitter element 57 recomposes the baseband video and audio signals to form a TV signal not unlike the one that is applied to element 55, and applies its output signal to TV monitor 55.

Controller 51 is coupled to frame & sound generation element 53. Element 53 is adapted to create various video images and/or sounds under direction of controller 51. Illustratively, element 53 may comprise a memory with a pre-stored collection of video signals (effectively, a large database), and controller 51 merely specifies the particular video signal that is to be retrieved and applied to combiner element 56. Alternatively, element 53 may include a processing capability, which permits use of a much smaller memory of pre-stored video signals. For example, element 53 may have a "curser" image that is stored, and a processing capability that can create a video image of a curser pointing at whatever x,y coordinate of the TV monitor's screen that the controller desires. In such an embodiment, controller 51 might, for example, send the command "curser, 65, 75" to element 53, and in response thereto element 53 creates a video signal that, when displayed on the screen of monitor 55, shows a curser that is 65% (of the screen's width) away from the left edge of the screen and 75% (of the screen's height) away from the top edge of the screen.

When an audio signal is generated by element 53, it is applied to combiner 56, wherein the generated audio signal is simply added to the audio signal provided by element 55, thereby creating the audio signal provided by combiner 56 to element 57. In an analogous manner, the video signal generated by element 53 is combined with the video signal provided by element 55. Video combining can be effected in numerous manners, as is well known in the art. Illustratively, the video image created by element 53 can be arranged to replace the video image provided by element 55 by having whatever pixel in the image generated by element 53 that is not a "black pixel," replace the pixel provided by element 55. Black pixels leave the video pixels provided by element 55 unchanged.

A user (not shown) can direct controller 51 through conventional remote controller unit 60 that sends commands to controller 51 by outputting an infrared (IR) signal. (A functionally equivalent controller is often also found integral to the television monitor.) The IR signal is accepted by IR receiver 58, and forwarded to controller 51. Conventionally, such a command might direct controller 51 to change the channel that is modulated by element 54 into the specific frequency band, to display a menu, e.g., to change the time shown on a clock of set-top 50 (not shown), to move a curser that is shown on monitor 55 pursuant to instructions from controller 51, as described above, etc. The very same commands of unit 60 can be used for the purposes of this invention.

In accord with the principles disclosed herein, two-way communication is established between DSP 621 in telephony module 600 and controller 51 to enable the user, through remote controller 60, to display telephony information on monitor 55 and to control telephony functions related to telephone 160.

It may be noted that cable modem 220 is drawn with an Internet module 700 and a telephony module 660. This is done solely to make the FIG. 3 arrangement resemble the FIG. 2 arrangement as closely as possible. If a computer interface to the Internet is not needed, a number of elements in the Internet module can be coalesced into the telephony module to form a compact design. Indeed, markedly different embodiments can also be employed without departing from the spirit of that which is disclosed herein.

Figure 4:
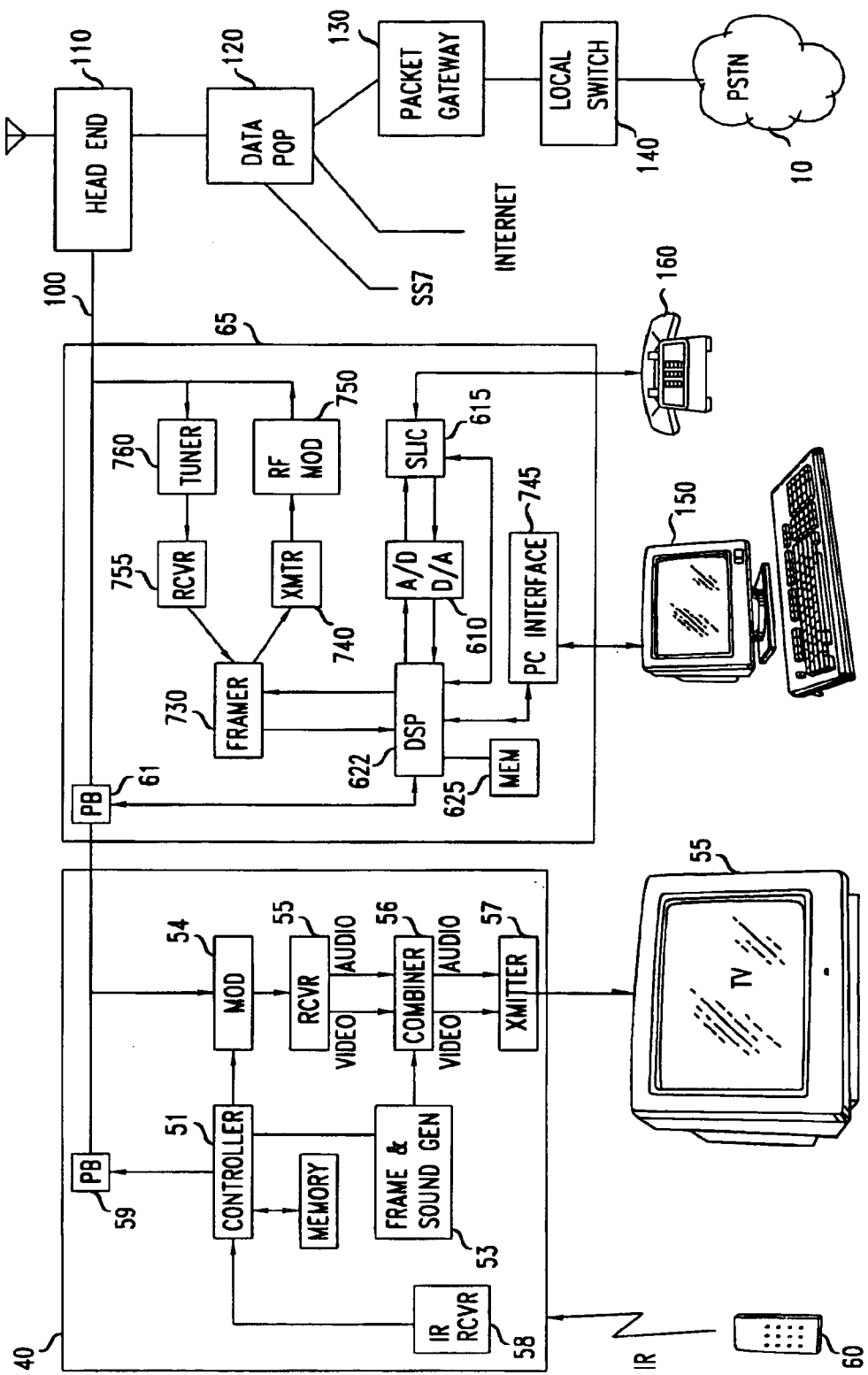
FIG. 4 is a block diagram of another illustrative embodiment in accord with the principles disclosed herein.

FIG. 4 presents one such other embodiment in accord with the principles disclosed herein, where, again, elements with labels that are the same as elements in FIGS. 2 and 3 perform the same respective functions. In FIG. 4, the point of connection of HFC cable 100 to equipment at the customer's premises is broadband telephone interface (BTI) module 65.

Within BTI 65, the signal of cable 100 is coupled to an arrangement comprising tuner 760, receiver 755, framer 730, transmitter 740, and RF modulator 750 in the same manner as these elements are connected in FIG. 2. Framer 220 is connected to DSP 622, with associated memory 625, which serves the functions of CPU 725 and DSP 621. DSP 622 is connected to interface circuit 745, which provides a port for PC 150, and to an arrangement that includes analog to digital conversion module 610 and SLIC module 615, where the latter provides a port for telephone 160.

Module 40 in FIG. 4 is the set-top box that provides television signals to TV monitor 55. In FIG. 3, the television signal is provided to set-top box 50 directly from cable 100. In contradistinction, in FIG. 4 the television signal is provided to set top box 50 through interposed BTI 65 and, more specifically, through interposed "piggy-back" (PB) element 61 within BTI 65. The purpose of circuit 61 is to eliminate the need for the separate line 223 that is employed in the FIG. 3 arrangement (which connects DSP 621 to controller 51). Set-top box 40 is identical to set-top box 50 of FIG. 3, except that it includes PB element 59 that is interposed between the input of set-top box 40 and controller 51. Thus, other than the significant benefit of eliminating a wire connection between the set-top box that connects to the television monitor and the BTI (which in a customer's home might be at the point of entry into the home) and the concomitant burden of using elements PB 61 and PB 59, the FIG. 3 and FIG. 4 embodiments are quite similar.

The function of the PB elements is to provide a signaling channel for communicating back and forth between controller 51 and DSP 622. This can be achieved in any of numerous ways that are well known to skilled artisans. One simple arrangement employs baseband digital signals that are added by PB 61 into the cable 100 signal that flows from PB 61 to PB 59, and a low-pass filter in PB 59 extracts the baseband digital signal. Communication in the reverse direction can take place in a similar manner. If necessary, a filter in inserted in PB 61 to insure that no undesirable baseband signals pass from HC 100 through PB 611 and, conversely, that no baseband signals that are applied to PB 61 or PB 59 are transmitted to HFC 100 toward the cable network's head end 110.

Figure 5:
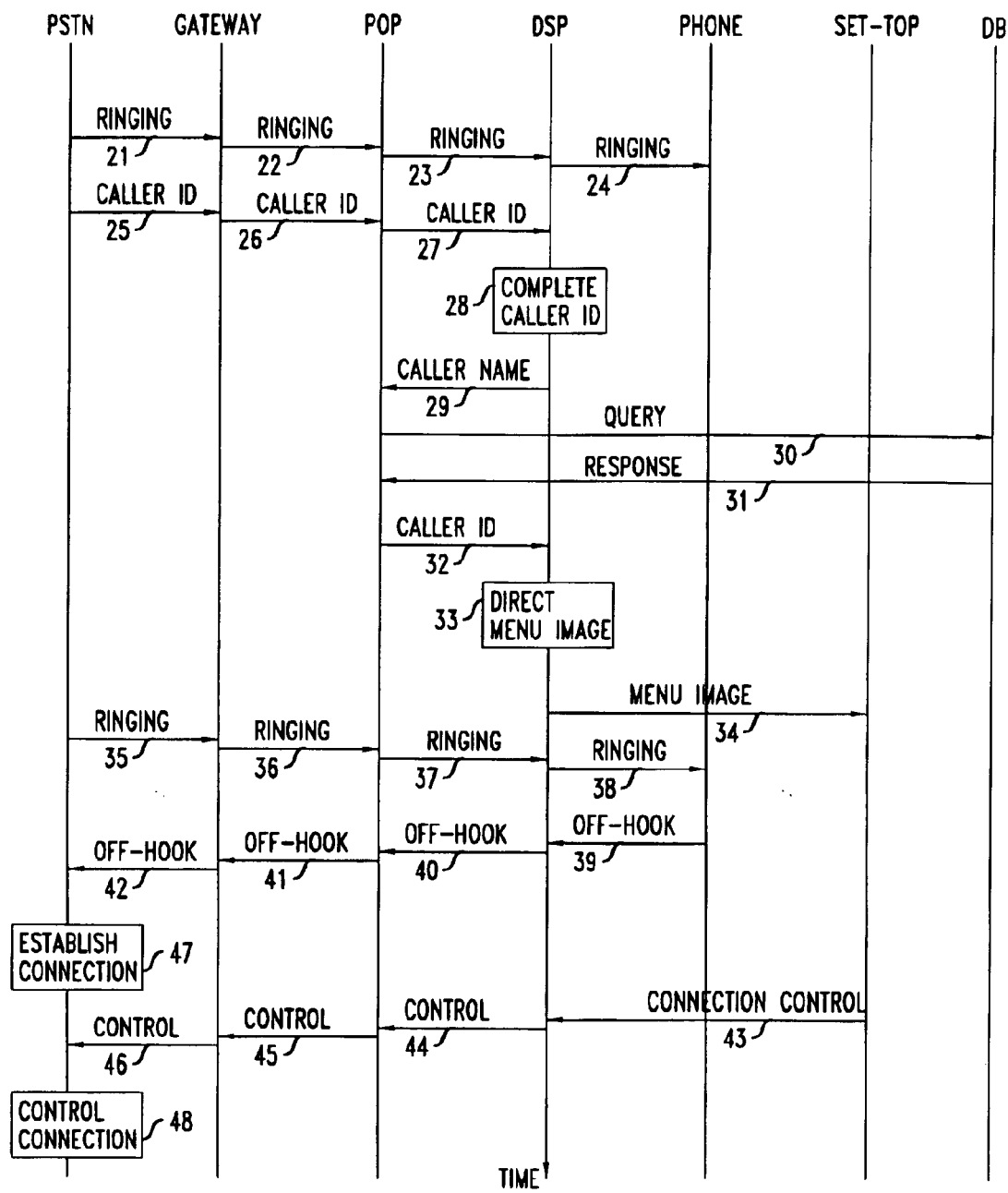
FIG. 5 is a flow diagram of a call progress.

With reference to the arrangement depicted in FIG. 4, FIG. 5 presents a signaling flow diagram for a call that is incoming to telephone 160. Conventionally, when a call arrives at the public switched telephone network (PSTN) 10 that is destined to telephone 160, the local exchange carrier (LEC) that receives the call appends to caller ID to call setup message that it forwards, through the signaling network (e.g., the SS7 network) to switch 140, which may belong to a LEC that is other that the LEC that originates the call. LEC 140 determines whether telephone 160 is busy, and if it is not, sends a ringing signal to packet gateway 130. This is shown in FIG. 5 by line 21. Gateway 130 recognizes the ringing signal and sends a corresponding control packet through POP 120 and head end 110 to HFC 100. This is shown by line 22. The packet is addressed (e.g. with IP address 199.222.104.160) so that only DSP 622 of BTI 65, which is programmed to be sensitive to address 199.222.104.160, accepts the packet. This is shown by line 23. DSP 622 ascertains that the packet represents a ringing signal, and proceeds to direct SLIC 615 to apply a ringing signal to telephone 160. This is shown by line 24.

Between the first ringing interval and the second ringing interval switch 140 outputs caller ID information is accordance with a standardized signaling format. This information is appropriately structured and formatted by gateway 130, POP 120, head end 110, tuner 760, receiving element 755 and framer 730, to arrive at DSP 622. This is shown in FIG. 5 by lines 25, 26, and 27. At step 28, DSP 622 ascertains whether the information received from switch 140 contains either an indication that the calling party consciously elected to not have its caller ID provided, or both the calling party's name and the calling party's telephone number are present. When only the calling party's telephone number is present, DSP 622 sends a request—upstream toward head end 110—to a server (not shown) that is accessible over the SS7 signaling network. The request provides the calling party's telephone number, and seeks a name to correspond to the provided number. More specifically, DSP creates a packet that addresses the aforementioned server, which advantageously contains a national database of telephone numbers and associated names, and sends the packet, appropriately modulated by framer 730, transmitter 740 and RF modulator 750, to head end 110. Head end 110 receives the information, sends the digital data to POP 120, and POP 120 recognizes the request aimed at the SS7 server. This national database is likely controlled by an inter-exchange carrier (IXC), or by a governmental authority. POP 120 accordingly constructs an SS7 signaling message and forwards the request to the server. This is shown by line 30 in FIG. 5. It is noted that POP 120 that includes a capability to communicate with the SS7 signaling network includes a functionality that is not present in conventional Internet Service Provider's equipment, but that additional functionality is quite conventional in any other respect and is well within the scope of all skilled artisans.

In response to the request, the server on the SS7 network sends a message back to POP 120, as shown by line 31, POP 120 constructs a packet, and forwards it to DSP 622 via head end 110, HFC 100, and elements 760, 755, and 730. This is shown by line 32. DSP 622 receives the name information and, armed with caller ID telephone number and caller name, in step 33 DSP 622 sends a message to controller 51 (via PB 61 and 59) to create a menu page.

Figure 6:
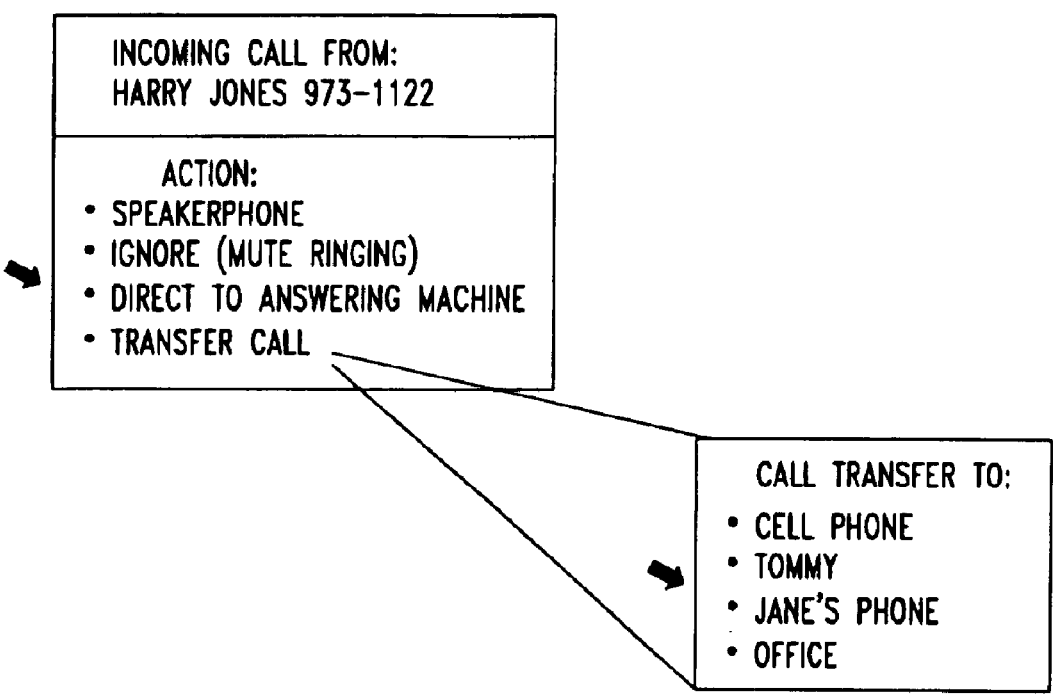
FIG. 6 illustrates two call progress menus.

Pursuant to the directive received from DSP 622, and in conformance with information stored in its associated memory, controller 51 directs frame & sound generator 53 to create a menu not unlike the one illustrated in the upper left hand portion of FIG. 6, as well as an associated curser. In the illustrated menu, the image on the screen of monitor 55 shows that an incoming call is present, and that the call is from a party that has a particular caller telephone number and name, as well as a variety of options that have been programmed into set-top box 40. Illustrative in FIG. 6, the options are (a) causing telephone 160 to go off-hook in a speakerphone mode (presuming, of course, that set-top box 40 was programmed to offer this option because telephone 160 does have a speakerphone mode), (b) ignoring the call and muting the ringing—to remove the annoyance of repeated ringing, (c) immediately direct the call to an associated answering machine, and (d) transferring the call. Option (c) assumes that an answering machine is hooked up in parallel with telephone 160 and that it is one that is adapted to accept a control signal between ringing intervals (e.g., not unlike the manner in which caller ID information is communicated) that causes the answering machine to immediately go off-hook. Option (d)—the call transfer option—requires a capability to transfer a call, and requires additional information from the user if the destination of the call transfer is not known a priori.

By using the arrows keys on the conventional controller 60, the user can point the curser to a particular option and press (illustratively) the "OK" button on controller 60 to decide on the desired option. For example, when the user chooses option (d)—the call transfer option—and presses the "OK" button, controller 51 directs frame & sound generator 53 to create and apply to combiner 56 the second menu. The second menu illustrated in FIG. 6 includes four options, illustrating four quite different transfer types. Option (a) "cell phone," is a transfer to an instrument that may, or may not, be on the customer's premises, but is accessible via the PSTN. Option (b) "Tommy," may be a "plain old telephone system" (POTS) phone in some room on the customer's premises, which has a different telephone number ("teen phone"). This phone may, or may not, be connected to PSTN via HFC cable 100. Option (c) "Jane's phone," may be an extension in, for example, Jane's home office within the customer's premises. This may be a phone that shares the same number as telephone 160. Lastly, option (d) "office," is a transfer to some other telephone connected to PSTN that, illustratively, is not connected to cable 100.

Implementing options (a) and (d) requires communication with head end 110. Option (b) can be implemented through communication with head end 110, or locally if Tommy's telephone line is incorporated within BTI 65 with a separate port that is coupled to DSP 622 through a second element not unlike element 745. Option (c) requires the ability to switch between telephone 160 and Jane's telephone, which implies a switching unit interposed between the output port of BTI 65 to which telephone 160 is shown to be connected and the two telephones (telephone 160 and Jane's telephone), or the creation of two ports out of DSP 622. Creation of such ports is clearly within the scope of any skilled artisan, if not already well known.

In connection with the options that direct a call transfer to a unit that is accessible via the PSTN or via the PSTN followed by a cellular network, when controller 51 receives a signal that corresponds to such a request, it interacts with the user to identify the specific destination, if appropriate. In the menu illustrated in FIG. 6 no such option is presented, but a skilled artisan can easily incorporate such an option. When controller 51 has sufficient information, it communicates its information to DSP 622, and DSP 622 creates an information packet for switch 140. This packet is communicated to head end 110 in the manner described above, and head end 110 transfers that packet to POP 120. POP creates a call transfer instruction that includes the destination telephone number and forwards the instruction to switch 140. Switch 140 executes the call transfer in a conventional manner.

In light of the above-disclosed two embodiments it should be realized that various other arrangements and methods are possible without departing from the spirit and scope of this invention. To illustrate one, FIG. 7 presents an embodiment where the BTI and the set-top box are combined in a single hardware unit, 66, where, the DSP 622 of FIG. 4 and the controller 51 of FIG. 4 are combined into a single DSP 623. All other elements in FIG. 7 that are numbered identically to like elements in FIG. 4 perform the same function.

What is claimed is:

1. A method for controlling telephonic communication in an arrangement where a telephone at a user's premises is coupled to a broadband interface module, that is connected to a remote PSTN interface arrangement through a cable that carries signals that correspond to (a) signals for apparatus that includes a monitor for display of video information, and (b) signals associated with said telephone, said method being carried out in said broadband interface module and comprising the steps of:

receiving call progress signaling information pertaining to said telephone from said PSTN interface arrangement;

analyzing said information to determine whether additional information is needed;

if said step of analyzing determines that said additional information is needed, (a) sending a query message via said PSTN interface arrangement, and (b) receiving a data message from said PSTN interface arrangement that is responsive to said sending;

creating a video message from said call progress signaling information and, if said step of determining determines that said additional information is needed, from said data message; and applying said video message to said monitor.

2. The method of claim 1 where said query message sent by said step of sending is to a server.

3. The method of claim 2 where said server is accessible to said PSTN interface arrangement via a telecommunication signaling network.

4. The method of claim 3 where said telecommunication signaling network is the SS7 signaling network.

5. The method of claim 2 where said server comprises a national database that associates telephone numbers with names.

6. The method of claim 2 where said server comprises a database that associates telephone numbers with names, spanning an area that is greater than an area served by a telecommunications service provider that serves any one caller.

7. The method of claim 1 where said call progress signaling information comprises a caller's telephone number.

8. The method of claim 7 where said step of analyzing determines that said additional information is needed when said call progress signaling information fails to comprise a caller's name as well as said caller's telephone number.

9. The method of claim 8 where said query message includes said caller's telephone number.

* * * * *